(12) United States Patent
Buck et al.

(10) Patent No.: US 8,492,498 B2
(45) Date of Patent: Jul. 23, 2013

(54) POLYMER COMPOSITIONS FOR ROTATIONAL MOLDING APPLICATIONS

(75) Inventors: Richard M. Buck, Bartlesville, OK (US); Albert P. Masino, Tulsa, OK (US); Qing Yang, Bartlesville, OK (US); Paul J. DesLauriers, Owasso, OK (US); Steven J. Secora, Bartlesville, OK (US); Elizabeth M. Lanier, Bartlesville, OK (US); Guylaine St. Jean, Bartlesville, OK (US); Jon D. Ratzlaff, Bartlesville, OK (US); Christopher E. Wittner, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 77 days.

(21) Appl. No.: 13/031,451

(22) Filed: Feb. 21, 2011

(65) Prior Publication Data

US 2012/0214954 A1 Aug. 23, 2012

(51) Int. Cl.
*C08L 23/08* (2006.01)
*C08F 210/16* (2006.01)

(52) U.S. Cl.
USPC ........ 526/348.2; 526/113; 526/114; 526/118; 526/119; 526/348; 526/348.4; 526/348.5; 526/348.6; 526/352; 525/240; 264/310; 264/311

(58) Field of Classification Search
USPC .............. 526/113, 114, 118, 119, 348, 348.2, 526/348.4, 348.5, 348.6, 352; 525/240; 264/310, 311
See application file for complete search history.

(56) References Cited

U.S. PATENT DOCUMENTS

| | | | |
|---|---|---|---|
| 3,248,179 A | 4/1966 | Norwood | |
| 4,252,762 A | 2/1981 | Stevenson | |
| 4,501,885 A | 2/1985 | Sherk et al. | |
| 4,588,790 A | 5/1986 | Jenkins, III et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 5,776,405 A | 7/1998 | Prout et al. | |
| 6,239,235 B1 | 5/2001 | Hottovy et al. | |
| 6,262,191 B1 | 7/2001 | Hottovy et al. | |
| 6,632,902 B2 | 10/2003 | Lahijani | |
| 6,833,415 B2 | 12/2004 | Kendrick et al. | |
| 6,969,741 B2 | 11/2005 | Lustiger et al. | |
| 7,307,126 B2 | 12/2007 | Lustiger et al. | |
| 7,332,543 B2 | 2/2008 | Follestad et al. | |
| 7,396,881 B2 | 7/2008 | Lustiger et al. | |
| 7,619,047 B2 | 11/2009 | Yang et al. | |
| 2003/0149180 A1 | 8/2003 | Van Dun | |
| 2007/0197374 A1 | 8/2007 | Yang | |
| 2007/0298508 A1 | 12/2007 | DesLauriers et al. | |
| 2009/0004417 A1 | 1/2009 | Follestad et al. | |

FOREIGN PATENT DOCUMENTS

| | | |
|---|---|---|
| EP | 1236770 | 9/2002 |
| WO | WO 2008002969 | 1/2008 |
| WO | WO 2008/136621 A1 * | 11/2008 |
| WO | WO 2011/004032 A1 * | 1/2011 |

OTHER PUBLICATIONS

DeSlauriers, Paul J., et al., "Estimating slow crack growth performance of polyethylene resins from primary structures such as molecular weight and short chain branching," Macromolecular Symposia, Special Issue: Polyolefin Characterization—ICPC 2008, Aug. 2009, vol. 282, issue 1, pp. 136-149.*
International Search Report for PCT/US2012/025919 dated May 4, 2012.
Janzen, J., et al., "Diagnosing long-chain branching in polyethylenes," Journal of Molecular Structure, 1999, vol. 485-486, pp. 569-584, Elsevier Science B.V.
"Plastic polyethylene tanks—information, origin and history," Feb. 19, 2010, 2 pages, Alltanks.com LLC.
"Rotational molding," Wikipedia, Feb. 23, 2010, available at http://en.wikipedia.org/wiki/Rotational_molding, 12 pages.

* cited by examiner

*Primary Examiner* — Roberto Rabago
(74) *Attorney, Agent, or Firm* — Conley Rose, P.C.; Rodney B. Carroll; Cheryl L. Huseman

(57) ABSTRACT

A polymer having a density of from about 0.94 g/cm³ to about 0.96 g/cm³ and a primary structure parameter 2 (PSP2 value) of greater than about 8.5, wherein an article formed from the polymer has an environmental stress crack resistance of equal to or greater than about 1000 hours when measured in accordance with ASTM D 1693 condition A. A polymer having at least one lower molecular weight component and at least one higher molecular weight component and having a PSP2 value of equal to or greater than about 8.5, wherein an article formed from the polymer has an environmental stress crack resistance of greater than about 1000 hours when measured in accordance with ASTM D 1693 condition A.

21 Claims, 2 Drawing Sheets

POLYMER COMPOSITIONS FOR ROTATIONAL MOLDING APPLICATIONS

FIELD OF THE INVENTION

The present disclosure relates to polymer compositions and articles made from same. More specifically, the present disclosure relates to polyethylene resin compositions for rotational molding applications.

BACKGROUND OF THE INVENTION

Polymeric articles have replaced metal articles in many applications such as liquid transportation and storage. Polymeric containers such as drums and tanks have several advantages over metal containers, including being of relatively lighter weight, more corrosion resistant, less expensive, more thermally and electrically insulating, tougher, more durable, and more easily shaped during manufacture.

For example, polyethylene compositions are used for the production of a wide variety of articles. Particularly, polyethylene drums and tanks are widely used as they are lighter weight than their metal counterparts and can easily be manufactured by rotational molding (also know as rotomolding). Often these articles (e.g., polyethylene drums and tanks) are exposed to numerous stresses during their lifetime, and that exposure may result in cracks or breaks that are expensive to repair, especially in situations where the article or structure is difficult to access. Thus, there is an ongoing need to develop polymeric compositions that can be used for rotomolding applications and concomitantly display resistance to the development of cracks or breaks.

SUMMARY OF THE INVENTION

Disclosed herein is a polymer having a density of from about 0.94 g/cm$^3$ to about 0.96 g/cm$^3$ and a primary structure parameter 2 (PSP2 value) of greater than about 8.9, wherein an article formed from the polymer has an environmental stress crack resistance of equal to or greater than about 1000 hours when measured in accordance with ASTM D1693 condition A.

Also disclosed herein is a polymer having at least one lower molecular weight component and at least one higher molecular weight component and having a PSP2 value of equal to or greater than about 8.9, wherein an article formed from the polymer has an environmental stress crack resistance of greater than about 1000 hours when measured in accordance with ASTM D 1693 condition A.

Further disclosed herein is a method comprising (a) contacting a catalyst system comprising at least two different transition metal complexes with an olefin under conditions suitable to form a polyolefin, and (b) recovering the polyolefin, wherein the polyolefin has a PSP2 value of equal to or greater than about 8.9 and wherein an article formed from the polyolefin has an environmental stress crack resistance of greater than about 1000 hours when measured in accordance with ASTM D 1693 condition A.

DETAILED DESCRIPTION

Figure 1:
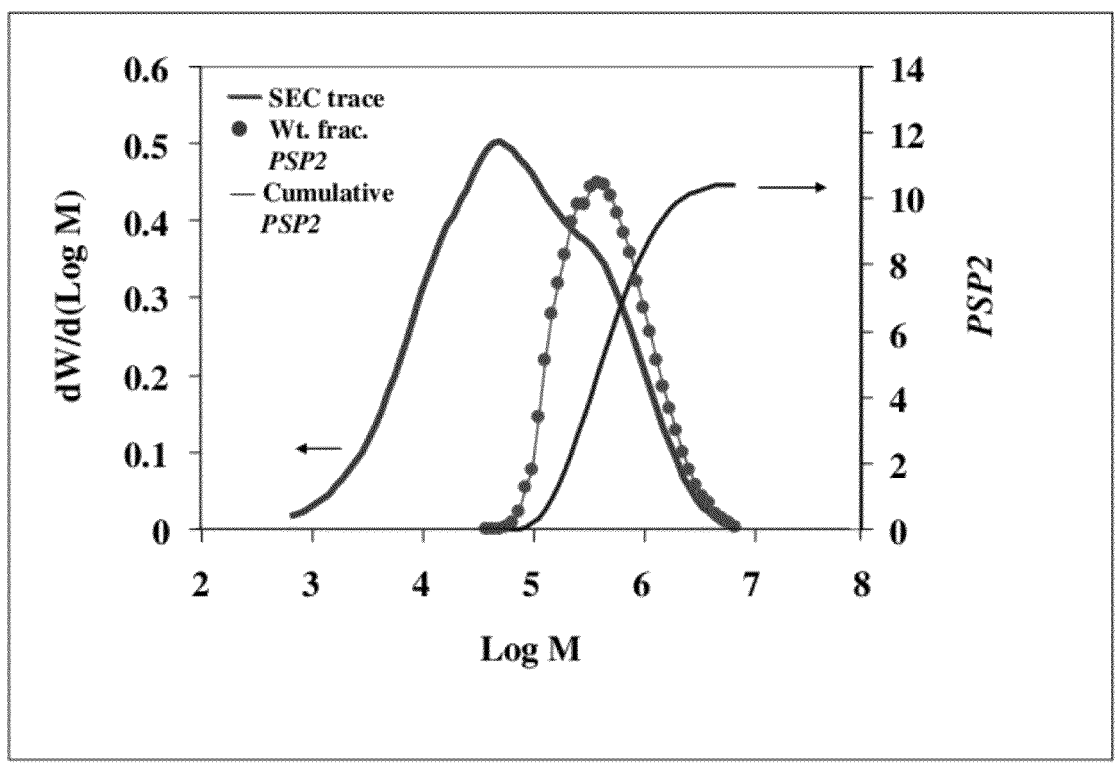
FIG. 1 is a plot of calculated primary structure parameter 2 values against log M for a bimodal polymer sample.

Disclosed herein are polymeric compositions, polymeric articles, and methods of making same. Such methods may comprise preparing a polymeric composition and forming the composition into an article. In an embodiment the polymeric composition comprises polyethylene or a copolymer thereof. In an embodiment, the polymeric composition and the articles prepared therefrom may display mechanical properties, in particular environmental stress crack resistance (ESCR), that significantly distinguish them from articles prepared from conventional polymeric compositions. Hereinafter such compositions are termed compositions having resistance to environmental stress cracking (CRESC).

In an embodiment, a CRESC of the type described herein may be prepared by any means, for example by employing one or more catalyst systems, in one or more reactors, in solution or in the gas phase, and/or by varying the comonomers in the polymerization reaction, and/or by changing any/ all of the materials or parameters involved in the production of the CRESC's, as will be described in more detail herein.

The CRESC of the present disclosure can be produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resins and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the CRESC of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the CRESC of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide CRESC resin properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product may be varied to determine the desired final product CRESC resin properties. Mechanical properties include, but are not limited to tensile strength, flexural modulus, impact resistance, creep, stress relaxation and hardness tests. Physical properties include, but are not limited to, density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific resin properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In an embodiment, a method of preparing a CRESC comprises contacting an olefin and/or alpha-olefin monomer with a catalyst system under conditions suitable for the formation of a polymer of the type described herein. Any catalyst system compatible with and able to produce polymers having the features disclosed herein may be employed. In an embodiment, the catalyst system comprises a transition-metal complex, an activator-support, and a cocatalyst each of which is described in more detail later herein. The terms "catalyst composition," "catalyst mixture," "catalyst system," and the like, do not depend upon the actual product resulting from the contact or reaction of the components of the mixtures, the nature of the active catalytic site, or the fate of the co-catalyst, the metallocene compound, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In an embodiment, the catalyst system for preparation of a CRESC comprises at least two metallocene complexes, an activator, and a cocatalyst. Catalyst systems suitable for use in this disclosure have been described for example in U.S. Pat. No. 7,619,047 and U.S. Patent Application Publication Nos. 2007/0197374 and 2009/0004417, each of which is incorporated by reference herein in its entirety.

A CRESC of the type described herein may comprise a homopolymer, a copolymer, and/or combinations thereof. In an embodiment, the CRESC may be a copolymer comprising a polymer of ethylene with one or more comonomers such as, for example, alpha olefins. Examples of suitable comonomers include, but are not limited to, unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an embodiment, the comonomer is 1-hexene. In an embodiment, the commoner may be present in the CRESC in an amount of from about 0.02 mol. % to about 2 mol. %, alternatively from about 0.01 mol. % to about 1.4 mol. %, alternatively from about 0.2 mol. % to about 1 mol. %.

The CRESC and/or the base PE resin may include other additives. Examples of additives include, but are not limited to, antistatic agents, colorants, stabilizers, nucleators, surface modifiers, pigments, slip agents, antiblocks, tackafiers, polymer processing aids, and combinations thereof. In an embodiment, the polymeric composition comprises carbon black. Such additives may be used singularly or in combination and may be included in the polymer composition before, during, or after preparation of the CRESC as described herein. Such additives may be added via any suitable technique, for example during an extrusion or compounding step such as during pelletization or subsequent processing into an end use article. CRESCs as described herein may be formed into various articles, including but not limited to, household containers, utensils, film products, drums, fuel tanks, pipes, geomembranes, and liners as will be discussed in greater detail later herein.

A CRESC of the type described herein may be a multimodal resin. Herein, the "modality" of a polymer resin refers to the form of its molecular weight distribution curve, i.e., the appearance of the graph of the polymer weight fraction as a function of its molecular weight. The polymer weight fraction refers to the weight fraction of molecules of a given size. A polymer having a molecular weight distribution curve showing a single peak may be referred to as a unimodal polymer, a polymer having a curve showing two distinct peaks may be referred to as a bimodal polymer, a polymer having a curve showing three distinct peaks may be referred to as a trimodal polymer, etc. Polymers having molecular weight distribution curves showing more than one peak may be collectively referred to as multimodal polymers or resins.

A CRESC of the type described herein may have two or more components that may be distinguishable from one another, for example based upon their individual composition and/or molecular weight distribution. A molecular weight distribution curve may be prepared for the individual component of the polymer resin. For example, the molecular weight distribution curve for the individual components of the polymer resin may display a single peak and thus be unimodal. The molecular weight distribution curves for the individual components may be superimposed onto a common chart to form the weight distribution curve for the polymer resin as a whole. Upon such superimposition, the resultant curve for the polymer resin as a whole may be multimodal or show n distinct peaks corresponding to n polymer components of differing molecular weight distributions. A bimodal polymer resin may show two distinct peaks corresponding to two individual components. For example, a bimodal polymer resin may have a first component that may be generally characterized as a higher molecular weight polymer component and a second component that may be generally characterized as a lower molecular weight polymer component. (e.g., the second component having a molecular weight that is lower than the first component). A trimodal polymer composition may show three distinct peaks corresponding to three individual polymer components. Alternatively, superimposition of the molecular weight distribution curves from the individual components may show a single peak that is broadened in comparison with the curves for the individual components corresponding to polymer fractions having different but overlapping molecular weight distributions. In an aspect, the CRESC comprises a bimodal base resin having a higher molecular weight (HMW) component and a lower molecular weight (LMW) component. In an embodiment the HMW component may be present in the CRESC in an amount ranging from about 90 weight percent (wt. %) to about 10 wt. %, alternatively from about 80 wt. % to about 20 wt. %, or alternatively from about 70 wt. % to about 30 wt. %. Herein wt. % refers to the weight percent of the total resin. In an embodiment the LMW component may be present in the CRESC in an amount ranging from about 10 weight percent wt. % to about 90 wt. %, alternatively from about 20 wt. % to about 80 wt. %, or alternatively from about 30 wt. % to about 70 wt. %. The remainder of the discussion will focus on a CRESC bimodal resin having a HMW component and a LMW component with the understanding that other polymeric compositions, for example having a different modality, may be employed in various aspects and embodiments.

In an embodiment, the CRESC has a weight average molecular weight ($M_w$) of from about 70 kg/mol to about 160 kg/mol, alternatively from about 80 kg/mol to about 155 kg/mol; or alternatively from about 95 kg/mol to about 150 kg/mol; a number average molecular weight ($M_n$) of from about 4 kg/mol to about 20 kg/mol, alternatively from about 6 kg/mol to about 18 kg/mol, or alternatively from about 11 kg/mol to about 16 kg/mol; and a z-average molecular weight of from about 260 kg/mol to about 400 kg/mol, alternatively from about 255 kg/mol to about 350 kg/mol, or alternatively from about 250 kg/mol to about 300 kg/mol. The weight average molecular weight describes the molecular weight distribution of a polymer composition. The number average molecular weight is the common average of the molecular weights of the individual polymers. The z-average molecular weight is a higher order molecular weight average. All molecular weight averages are expressed in kilogram per mole (kg/mol). $M_n$, $M_w$, and $M_z$ may be calculated according to equations i, ii, and iii respectively where $N_i$ is the number of molecules of molecular weight $M_i$.

$$M_n = \frac{\Sigma_i N_i M_i}{\Sigma_i N_i} \quad \text{Equation (i)}$$

$$M_w = \frac{\Sigma_i N_i M_i^2}{\Sigma_i N_i M_i} \quad \text{Equation (ii)}$$

$$M_z = \frac{\Sigma_i N_i M_i^3}{\Sigma_i N_i M_i^2} \quad \text{Equation (iii)}$$

The CRESC may further be characterized by a broad molecular weight distribution (MWD). The MWD of the CRESC is the ratio of the weight average molecular weight to the number average molecular weight, which is also referred to as the polydispersity index (PDI) or more simply as polydispersity. A CRESC of the type disclosed herein may have a PDI of from about 4 to about 32, alternatively from about 5 to about 25, or alternatively from about 6 to about 20.

The CRESC may be further characterized by the degree of branching present in the individual components and/or in the composition as a whole. Short chain branching (SCB) is known for its effects on polymer properties such as stiffness, tensile properties, heat resistance, hardness, permeation resistance, shrinkage, creep resistance, transparency, stress crack resistance, flexibility, impact strength, and the solid state properties of semi-crystalline polymers such as polyethylene. Long chain branching (LCB), on the other hand, exerts its effects more on the rheology of the polymer. That is to say, LCB tends to effect parameters relating to the flow of polymeric materials, such as for example, viscosity, shear response, elongation at break, die swell, melt index, and so on. In an embodiment, the CRESC displays SCB ranging from about 0.1 to about 10 short chain branches per 1000 total carbon atoms; alternatively from about 0.5 to about 7; alternatively from about 1 to about 5. SCB may be determined using any suitable methodology, such as for example gel permeation chromatography (GPC). In an embodiment, the CRESC may display LCB of less than about 10 ppm, alternatively less than about 5 ppm, alternatively less than about 1 ppm wherein the LCB content is defined by JC alpha. JC alpha refers to a methodology for determining the LCB content in a polymer based on the model proposed by Janzen and Colby in the Journal of Molecular Structure, 485-486 (1999) pp. 569-584, the relevant portions of which are incorporated by reference herein.

A CRESC of the type disclosed herein may have a primary structure parameter (PSP2) of equal to or greater than about 8.9, alternatively equal to or greater than about 9, alternatively equal to or greater than about 9.5. The PSP2 calculation as outlined by DesLauriers and Rohlfing in *Macromolecular Symposia* (2009), 282 (Polyolefin Characterization—ICPC 2008), pages 136-149 is incorporated by reference herein. The PSP2 calculation can be generally described as a multi-step process. The first step involves estimating the homopolymer density of a sample from the sample's molecular weight distribution as described by Equation 1. The first step takes into account the effects of molecular weight on sample density.

$$1/\rho = \sum (w_i/\rho_i) = \int \frac{1}{\rho}\left(\frac{dw}{d\text{Log}M}\right) d\text{Log}M \quad \text{(Eq. 1)}$$

where: $\rho = 1.0748 - (0.0241)\text{Log } M$.

Density values at molecular weights less than 720 g/mol are equal to 1.006 g/cm³ according to this method. In the second step, to further account for the added contributions to density suppression by the presence of short chain branching for each MW slice, the difference between the measured bulk density of copolymer and the calculated homopolymer density is divided by the overall SCB level (as measured by size exclusion chromatography-Fourier transform infrared spectroscopy or by C13-NMR) and subsequently applied to the SCB level in each MW slice. Typical MWD and SCB data obtained by SEC-FTIR for a bimodal polymer sample are shown in FIG. 1. The original observed bulk density of the copolymer (down to 0.852 g/cm³) is obtained through summation of the MW slices as described above. The calculations have been simplified by assuming that all SCB levels will have the same effect on density suppression. However, it is to be understood that the effectiveness of a particular SCB level to suppress density will vary (i.e., the ability of SCB to disrupt crystallinity decreases as the level of SCB increases). Alternately, if the density of the copolymer is not known, then the effects of SCB on sample density can be estimated in the second step by using Equation 2 as described by DesLauriers and Rohlfing in Patent Application Publication No. 2007/0298508, where the change in density $\Delta\rho$ refers to the value that is subtracted from the value given in equation 1 on a molecular slice by slice basis.

$$\Delta\rho = C_1(\text{SCB}/\text{PDI}^n)^{C_2} - C_3(\text{SCB}/\text{PDI}^n)^{C_4} \quad \text{(Eq 2)}$$

In Equation 2, $C_1$=1.25E-02, $C_2$=0.5, $C_3$=7.51E-05, $C_4$=0.62 and n=0.32. The third step in calculating PSP2 is to calculate the quantity of $2l_c + l_a$ where $l_c$ is the estimated crystalline lamella thickness (in nm) and $l_a$ is the estimated thickness (in nm) of the amorphous material at a particular molecular weight given by the following equations:

$$T_m(°C.) = (20587.5149640828)\rho^3 - (63826.2771547794)\rho^2 + (65965.7028912473) - 22585.2457979131 \quad \text{(Eq 3.)}$$

$$l_c(\text{nm}) = \frac{0.624 \text{ nm} \cdot T_m^0(K)}{T_m^0(K) - T_m(K)} \quad \text{(Eq. 4)}$$

In equation 3, assigned values of 20° C. and 142.5° C. are given for density values of 0.852 g/cm³ and 1.01 g/cm³, respectively. Equation 4 is a form of the well accepted Gibbs Thompson equation. The thickness of the amorphous layer ($l_a$) is calculated using the equations 5a and 5b:

$$w_c = \left(\frac{\rho_c}{\rho}\right)\left(\frac{\rho - \rho_a}{\rho_c - \rho_a}\right) \quad \text{(Eq. 5a)}$$

$$l_a = \rho_c l_c (1 - w_c)/\rho_a w_c \quad \text{(Eq. 5b)}$$

where: $w_c$ = weight fraction crystallinity $\rho$ = calculated density of MW slice $\rho_c$ = density of 100% crystalline sample (assigned 1.006 g/cm³)

$\rho_a$ = density of amorphous phase (0.852 g/cm³)

The fourth step calculates the tie molecule probability (P) for each molecular weight and respective $2l_c + l_a$ value according to equations 6a and 6b:

$$P = \frac{1}{3} \frac{\int_L^\infty r^2 \exp(-b^2 r^2) dr}{\int_0^\infty r^2 \exp(-b^2 r^2) dr} \quad \text{(Eq. 6a)}$$

where $b^2 = \frac{3}{2\bar{r}^2}$ and $\bar{r}^2 = (Dnl^2)$.

The symbols above have the following meanings:
P=Probability of tie-chain formation
L=Critical distance (nm)=$2l_c+l_a$
D=Chain extension factor in melt=6.8 for polyethylene
n=Number of links=$M_w/14$ for polyethylene
l=The link length=0.153 nm for polyethylene $$P = \frac{1}{3} \frac{\frac{\sqrt{\pi}}{4b^3} - \int_0^L r^2 \exp(-b^2 r^2) dr}{\frac{\sqrt{\pi}}{4b^3}} \quad \text{(Eq. 6b)}$$

$$= \frac{1}{3}\left(1 - \frac{4b^3}{\sqrt{\pi}} \int_0^L r^2 \exp(-b^2 r^2) dr\right)$$

Finally PSP2 values are calculated from Equations 6a and 6b by treating this value essentially as a weighing factor ($P_i$) for each slice of the MWD, where $P_i$ was arbitrarily multiplied ×100 and subsequently defined as $PSP2_i$. As in all of the aforementioned calculations, this value at each slice is multiplied by the respective weight fraction ($w_i$) of the MWD profile in order to obtain a value for the bulk polymer. A plot of the calculated ($w_i PSP2_i$) values against log M for a bimodal polymer sample is shown in FIG. 1 along with a plot of the cumulative PSP2 across the MWD which can also be insightful when attempting understand and predict structure property relationships. The area underneath the resulting $w_i PSP2_i$ vs. log M curve defines PSP2 for the whole polymer sample. For the polymer sample depicted in FIG. 1 PSP2=10.3.

In an embodiment, a CRESC of the type described herein is characterized by a density of from about 0.941 g/cm³ to about 0.965 g/cm³, alternatively from about 0.941 g/cm³ to about 0.955 g/cm³, or alternatively from about 0.941 g/cm³ to about 0.950 g/cm³. For example, the CRESC may be a polyethylene homopolymer or copolymer having a density of greater than about 0.942 g/cm³, alternatively greater than about 0.941 g/cm³, or alternatively greater than about 0.94 g/cm³.

In an embodiment, a CRESC of the type described herein has a melt index, MI, in the range of from about 0.5 dg/min to about 12 dg/min, alternatively from about 0.5 dg/min to about 6 dg/min, alternatively from about 1.5 dg/min to about 5 dg/min, alternatively from about 1 dg/min to about 6 dg/min, alternatively from about 1.5 dg/min to about 5 dg/min, or alternatively from about 2 dg/min to about 4 dg/min. The melt index (MI) refers to the amount of a polymer which can be forced through an extrusion rheometer orifice of 0.0825 inch diameter when subjected to a force of 2160 grams in ten minutes at 190° C., as determined in accordance with ASTM D 1238.

In an embodiment, a CRESC of the type described herein has a high load melt index, HLMI, in the range of from greater than about 0 dg/min to about 200 dg/min; alternatively from about 0.1 dg/min to about 200 dg/min, alternatively from about 5 dg/min to about 150 dg/min, alternatively from about 10 dg/min to about 95 dg/min The HLMI represents the rate of flow of a molten resin through an orifice of 0.0825 inch diameter when subjected to a force of 21,600 grams at 190° C. as determined in accordance with ASTM D 1238.

In an embodiment, a CRESC of the type described herein has a shear response in the range of from about 20 to about 75, alternatively from about 25 to about 50, alternatively from about 30 to about 45, alternatively from about 30 to about 40. The shear response refers to ratio of high load melt index to melt index (HLMI/MI).

In an embodiment, the CRESC exhibits a tensile strength at yield of from about 2000 psi to about 6,000 psi, alternatively from about 3,000 psi to about 5,800 psi, alternatively from about 4,800 psi to about 5,600 psi as determined in accordance with ASTM E2092. The tensile strength at yield refers to the tensile stress where an increase in expansion is admitted without an increase in gaining the weight on stress-strain curve. In an embodiment, the CRESC exhibits a tensile strength at break of from about 2,900 psi to about 3,600 psi, alternatively of from about 3,100 psi to about 3,600 psi, alternatively from about 3,300 psi to about 3,600 psi as determined in accordance with ASTM E2092. The tensile strength at break refers to the tensile stress at the moment the material is destroyed.

In an embodiment, the CRESC exhibits an elongation at break of from about 200% to about 800%, alternatively of from about 450% to about 780%, alternatively from about 690% to about 760% as determined in accordance with ASTM E2092. The elongation at break refers to the elongation which corresponds to the tensile breaking strength.

The CRESC may be formed into various articles, including, but not limited to, bottles, drums, toys, household containers, utensils, film products, fuel tanks, pipes, geomembranes, and liners. Various processes may be used to form these articles, including, but not limited to, blow molding, extrusion molding, rotomolding, thermoforming, cast molding and the like.

In an embodiment, the CRESC of this disclosure is fabricated into a container by a shaping process such as rotomolding. Rotomolding is particularly well suited for producing hollow items such as pipe, drums, and tanks. The physical properties of the CRESC described herein lend itself well to the desired characteristics of these and similar final products.

There are numerous variations and subtleties to the rotomolding process, as practiced, and no attempt is made here to provide an inclusive description of all embodiments of rotomolding. Instead, an illustrative description is provided to teach the fundamental aspects of this processing methodology. Components of common rotomolding processes may include an oven, a cooling chamber, mold spindles, and a mold or molds. The spindles are mounted on a rotating axis, which provides a uniform coating of the plastic inside each mold. Molds are typically either fabricated from welded sheet steel or are cast. Molds may be manufactured from stainless steel, aluminum, or other suitable material. A more detailed description of the rotomolding process and associated equipment may be found in U.S. Pat. Nos. 6,632,902 and 4,252,762, each of which is incorporated by reference herein in its entirety.

A method of making a rotomolded article such as a pipe, drum, or tank comprises introducing an appropriate quantity of a polymeric material (e.g., a CRESC of the type described herein) in a form or mold. Typically, the mold is then heated, either directly with a flame, indirectly with radiant heating, or other heating method. As it is heated, it is rotated about two axes. The heat and rotational motion combine to melt and evenly distribute the CRESC onto the internal surfaces of the mold. After a suitable time has passed, the mold is cooled with a cooling medium (e.g, air, water, or combination thereof).

The mold is then opened or otherwise disassembled, and the finished product is removed. The article may undergo additional processing steps to form the end-use article. A more detailed description of the rotomolding process and associated equipment may be found in U.S. Pat. Nos. 6,632,902 and 4,252,762.

In an embodiment, the polymeric articles fabricated from CRESC's of this disclosure display enhanced mechanical properties such as an increased ESCR, and improved color when compared to an article fabricated from a dissimilar polymeric material.

In an embodiment, the article formed from a CRESC of the type described herein has an ESCR of greater than about 1000 hours, alternatively greater than about 2000 hours, alternatively greater than about 5000 hours as determined in accordance with ASTM D1693 condition A. Environmental stress cracking refers to the premature initiation of cracking and embrittlement of a plastic due to the simultaneous action of stress, strain and contact with specific chemical environments. Environmental Stress Crack Resistance (ESCR) measures a polymer's resistance to this form of damage.

In an embodiment, the article formed from a CRESC of the type described herein has a APHA color value in the range of from about −250 to about 400, alternatively from about −175 to about 375, alternatively from about −100 to about 325. APHA color is an important characteristic of polymers which reflects the optical clarity of the polymer with respect to its yellowness. APHA color refers to a platinum-cobalt color standard as determined by ASTM 1045-58 which involves visual comparison of a liquid sample of the polymer with solutions having standard concentrations of potassium chloroplatinate and cobaltous chloride. Reduction of APHA color, i.e. reduction in yellowness, is desired because it affects the quality of the final product. In an embodiment, a CRESC of the type described herein may be a polyethylene copolymer, such as a polyethylene copolymer with 1-hexene, having a density of equal to or greater than about 0.940 $g/cm^3$. Such CRESCs may afford the production of articles (e.g., rotomolded articles) having thinner walls that advantageously display an ESCR of greater than about 1000 hours when tested in accordance with ASTM D1693 condition A. The resultant articles having thinner walls and improved ESCR may be used to produce lighter products with concomitant advantages in terms of manufacturing costs, transportation and storage.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner. The following testing procedures were used to evaluate the various polymers and compositions.

High load melt index (HLMI, g/10 min) was determined in accordance with ASTM D 1238 condition E at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D 1505 and ASTM D 1928, procedure C.

Molecular weights and molecular weight distributions were obtained using a PL-GPC 220 (Polymer Labs, UK) system equipped with a differential refractive index detector and three 7.5 mm×300 mm 20 um Mixed A-LS columns (Polymer Labs) running at 145° C. The flow rate of the mobile phase, 1,2,4-trichlorobenzene (TCB) containing 0.5 g/L 2,6-di-t-butyl-4-methylphenol (BHT), was set at 1 mL/min and the concentration of polymer solutions was generally kept in the range of 1.0-1.5 mg/mL, depending on the molecular weights. Sample preparation was conducted at 150° C. for 4 hours with occasional and gentle agitation before the solutions being transferred to sample vials for injection. In order to minimize the unbalanced solvent peak, solvent with the same composition as the mobile phase was used for sample preparation. The integral calibration method was employed to deduce molecular weights and molecular weight distributions using a Chevron Phillips Chemical Company polyethylene, Marlex BHB5003, as the broad standard. The integral table of the broad standard was pre-determined in a separate experiment with size exclusion chromatography using detection by multi-angle light scattering photometry (SEC-MALS).

Example 1

CRESCs of the type described herein were prepared using a catalyst system comprising at least two metallocene complexes. Particularly samples designated 1-3 were prepared using a catalyst system comprising a first blend of two metallocene complexes, designated Catalyst System I, while samples 4-15 were prepared using a catalyst system comprising a second blend of two metallocene complexes, designated Catalyst System 2. In general, the polymerization runs were conducted in a one-gallon (3.8-liter) stainless steel reactor as follows. First, the reactor was purged with nitrogen and then with isobutane vapor. The desired amount of triisobutylaluminum (TIBA), activator-support and with catalysts, both of the type previously described herein, were added in that order through a charge port while venting isobutane vapor. The charge port was closed and 1.8 L of isobutane was added. The contents of the reactor were stirred and heated to a desired temperature followed by the introduction of ethylene and hydrogen, with the hydrogen added at a fixed mass ratio with respect to the ethylene flow. Hydrogen was added with the ethylene via an automated feeding system, while the total reactor pressure was maintained at a desired pressure by the combined ethylene/hydrogen/isobutane/hexene addition. The reactor was maintained and controlled at the desired temperature throughout the desired run time of the polymerization. Upon completion, the isobutane and ethylene were vented from the reactor, the reactor was opened, and the polymer product was collected and dried.

Figure 2:
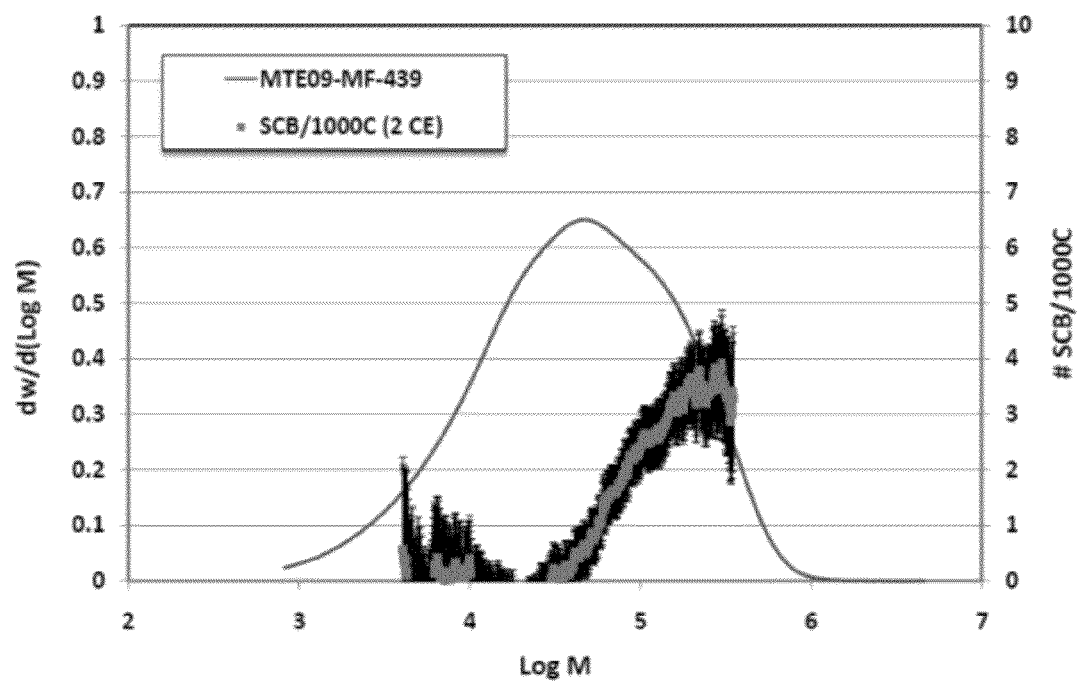
FIG. 2 is a plot of the short chain branching distribution for sample 15 from example 1.

The resultant polymer was recovered and the MW in kg/mol, polydispersity index, SCB per 1000 carbon atoms and LCB per 10,000 carbon atoms for the samples determined as indicated in Table 1. FIG. 2 is a plot of the SCB distribution for sample 15. Additionally, the MI, density, ESCR under the noted conditions, and SP-nCTL of the samples was determined and those values are presented in Table 2. SP-nCTL refers to single point notched constant tensile load and was determined in accordance with ASTM D 5397 at 30% yield. Sample 16 is a commercialized product and is provided for comparison to CRESCs of this disclosure.

TABLE 1

| Sample No. | $M_w$ (kg/mol) | $M_w/M_n$ | Estimated LCB (#/10,000 C) |
|---|---|---|---|
| 1 | 98 | 13.7 | 0.049 |
| 2 | 102 | 23.6 | 0.045 |
| 3 | 109 | 17.1 | 0.037 |

TABLE 1-continued

| Sample No. | $M_w$ (kg/mol) | $M_w/M_n$ | Estimated LCB (#/10,000 C) |
|---|---|---|---|
| 4 | 96 | 18.5 | 0.046 |
| 5 | 92 | 20.1 | 0.057 |
| 6 | 85 | 19.5 | 0.056 |
| 7 | 81 | 18.7 | 0.064 |
| 8 | 81 | 12.3 | 0.066 |
| 9 | 92 | 7.4 | 0.031 |
| 10 | 100 | 6.7 | 0.032 |
| 11 | 147 | 10.9 | 0.026 |
| 12 | 128 | 10.6 | 0.024 |
| 13 | 121 | 9.0 | 0.026 |
| 14 | 113 | 8.4 | 0.027 |
| 15 | 94 | 7.6 | 0.034 |
| 16 | 85 | 4.7 | 0.019 |

TABLE 2

| Sample No. | MI (dg/min) | Density (g/cc) | ESCR Cond. A 10% F50, hours | ESCR Cond. A, 100% F50, hours | ESCR Cond. B 10% F50, hours | ESCR Cond. B 100% F50, hours | SP-nCTL @ 30% Yield hours |
|---|---|---|---|---|---|---|---|
| 1 | 2.00 | 0.9469 | >2200 | >2200 | >2200 | >2200 | 168 |
| 2 | 1.70 | 0.9469 | >2200 | >2200 | >2200 | >2200 | 64 |
| 3 | 1.39 | 0.9464 | >2200 | >2200 | >2200 | >2200 | 493 |
| 4 | 2.34 | 0.9494 | 1348 | >2200 | 1792 | >2200 | 3 |
| 5 | 2.50 | 0.9476 | >2200 | >2200 | >2200 | >2200 | 54 |
| 6 | 3.46 | 0.9473 | >2200 | >2200 | >2200 | >2200 | 32 |
| 7 | 4.17 | 0.9482 | >2200 | >2200 | >2200 | >2200 | 13 |
| 8 | 5.00 | 0.9496 | >1800 | >1800 | >1800 | >1800 | — |
| 9 | 3.22 | 0.9425 | >1800 | >1800 | >1800 | >1800 | — |
| 10 | 2.34 | 0.9418 | >1800 | >1800 | >1800 | >1800 | — |
| 11 | 0.44 | 0.9460 | >1148 | >1148 | >1148 | >1148 | >3145 |
| 12 | 0.80 | 0.9460 | >1148 | >1148 | >1148 | >1148 | 2015 |
| 13 | 1.04 | 0.9466 | >1148 | >1148 | >1148 | >1148 | 563 |
| 14 | 1.48 | 0.9481 | >1148 | >1148 | >1148 | >1148 | 129 |
| 15 | 2.75 | 0.9457 | >1148 | >1148 | >1148 | >1148 | 55 |
| 16 | 6.18 | 0.9441 | 28 | 61 | 47 | 81 | 1.3 |

Example 2

PSP2 values were calculated for CRESCs prepared by physical blending (samples B1-B4) and CRESCs prepared by reactor blending (Samples 1, 7, 5, and 15). Samples B1-B4 were prepared using the resins described in Table 3, in the amounts indicated in Table 4. Table 4 also presents the weight average molecular weight, polydispersity index, short chain branching, density, ESCR and PSP2 values of the samples prepared by physical blending (Samples B1-B4). Table 5 presents similar information for samples prepared by reactor blending.

TABLE 3

| Component | $M_w$ (kg/mol) | PDI | SCB/1000 TC |
|---|---|---|---|
| C1 | 41 | 4.2 | 0.2 |
| C4 | 56 | 3.0 | 1.8 |
| C2 | 66 | 3.0 | 1.8 |
| C3 | 68 | 3.8 | 2.2 |
| C5 | 141 | 2.7 | 2.0 |
| C6 | 150 | 2.5 | 3.0 |
| C7 | 187 | 2.1 | 10.5 |

TABLE 4

| Sample | Composition | $M_w$ (kg/mol) | PDI | SCB/1000 TC | Density (g/cc) | ESCR (h) 100% Condition A | ESCR (h) 100% Condition A | PSP2 |
|---|---|---|---|---|---|---|---|---|
| B1 | 55% C2 & 45% C6 | 111 | 3.8 | 2.33 | 0.946 | 122 | 126 | 7.2 |
| B2 | 51% C4 & 49% C6 | 106 | 3.9 | 2.41 | 0.945 | 82 | 194 | 7.7 |
| B3 | 65% C3 & 35% C5 | 103 | 4.2 | 2.10 | 0.945 | 72 | 84 | 6.6 |
| B4 | 58% C1 & 42% C7 | 98 | 9.7 | 4.53 | 0.948 | 2136 | NA | 9.8 |

TABLE 5

| Sample | $M_w$ (kg/mol) | PDI | SCB/1000 TC | Density (g/cc) | ESCR (h) 100% Condition A | ESCR (h) 100% Condition A | PSP2 |
|---|---|---|---|---|---|---|---|
| 1 | 98 | 13.7 | 3.90 | 0.947 | >2200 | >2200 | 9.3 |
| 7 | 81 | 18.7 | 3.20 | 0.948 | >2200 | >2200 | 9.7 |
| 5 | 92 | 20.1 | 3.80 | 0.948 | >2200 | >2200 | 9.7 |
| 15 | 94 | 7.6 | 1.40 | 0.946 | >1148 | >1148 | 8.9 |

While embodiments of the invention have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc.

should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

What is claimed is:

1. A polymer having a density of from about 0.94 g/cm$^3$ to about 0.96 g/cm$^3$, a primary structure parameter 2 (PSP2) value of greater than about 8.9, a z-average molecular weight of from about 260 kg/mol to about 400 kg/mol, and an environmental stress crack resistance of equal to or greater than about 1000 hours when measured in accordance with ASTM D 1693 condition A wherein the polymer is a polyolefin.

2. The polymer of claim 1 having an environmental stress crack resistance of equal to or greater than about 2000 hours.

3. The polymer of claim 1 having a HLMI of from about 0 to about 200 dg/min.

4. The polymer of claim 1, wherein the polymer comprises polyethylene.

5. The polymer of claim wherein the polymer comprises a copolymer of ethylene and a comonomer comprising 1-hexene, 1-heptene, 1-octene 1-nonene, 1-decene, or combinations thereof.

6. The polymer of claim 1 having a number average molecular weight of from about 4 kg mol to about 20 kg/mol.

7. The polymer of claim 1 having a weight average molecular weight of from about 70 kg/mol to about 160 kg/mol.

8. The polymer of claim 1 having an APHA color of from about −250 to about 400.

9. The polymer of claim 1 having short chain branching of from about 0.1 to about 10 short chain branches per 1000 total carbon atoms.

10. The polymer of claim 1 having a tensile strength at break of from about 2000 psi to about 6000 psi.

11. The polymer of claim 1 having a shear response of from about 20 to about 75.

12. The polymer of claim 1 having a melt index of from about 0.5 dg/min. to about 12 dg/min.

13. An article formed from the polymer of claim 1.

14. The article of claim 13, wherein the article is formed via rotational molding.

15. A polymer having at least one lower molecular weight component and at least one higher molecular weight component, a PSP2 value of equal to or greater than about 8.9, a z-average molecular weight of from about 260 kg/mol to about 400 kg/mol, and an environmental stress crack resistance of greater than about 1000 hours when measured in accordance with ASTM D1693 condition A wherein the polymer is a polyolefin.

16. The polymer of claim 15, wherein the higher molecular weight component is present in an amount of from about 10 wt. % to about 90 wt. %.

17. The polymer of claim 15 having a polydispersity index of from about 4 to about 18.

18. The polymer of claim 15 having a tensile strength at break of from about 2000 psi to about 6000 psi.

19. The polymer of claim 15 having a degree of long chain branching of less than about 10 ppm.

20. A method comprising rotomolding the polymer of claim 1 to form a hollow article.

21. The polymer of claim 15, wherein the polymer is a copolymer of ethylene and 1-hexene.

* * * * *